United States Patent
Topmöller et al.

(10) Patent No.: US 12,284,941 B2
(45) Date of Patent: Apr. 29, 2025

(54) SCREENING DEVICE WITH AT LEAST ONE SUCTION NOZZLE

(71) Applicant: CLAAS Selbstfahrende Erntemaschinen GmbH, Harsewinkel (DE)

(72) Inventors: Philipp Topmöller, Herzebrock-Clarholz (DE); Thomas Tiggemann, Ennigerloh-Osterfelde (DE); Roger Helmut Koitzsch, Bielefeld (DE); Norbert Vorwerk, Osnabrück (DE)

(73) Assignee: CLAAS Selbstfahrende Erntemaschinen GmbH, Harsewinkel (DE)

( * ) Notice: Subject to any disclaimer, the term of this patent is extended or adjusted under 35 U.S.C. 154(b) by 399 days.

(21) Appl. No.: 17/732,835

(22) Filed: Apr. 29, 2022

(65) Prior Publication Data

US 2022/0346314 A1    Nov. 3, 2022

(30) Foreign Application Priority Data

Apr. 30, 2021    (DE) .......................... 102021111281.8

(51) Int. Cl.
*A01D 41/12* (2006.01)
*A01D 41/02* (2006.01)
(Continued)

(52) U.S. Cl.
CPC ......... *A01D 41/1252* (2013.01); *A01D 41/02* (2013.01); *F01P 11/12* (2013.01); *B01D 46/682* (2022.01)

(58) Field of Classification Search
CPC .. A01D 41/1252; A01D 75/187; A01D 41/12; A01D 41/02; B01D 46/682; B01D 2273/28; F01P 11/12
See application file for complete search history.

(56) References Cited

U.S. PATENT DOCUMENTS

| | | | | |
|---|---|---|---|---|
| 2,601,704 | A | * | 7/1952 | Streun ...................... D01B 1/04 55/286 |
| 4,036,613 | A | * | 7/1977 | Brown ................... B01D 46/42 15/418 |

(Continued)

FOREIGN PATENT DOCUMENTS

| | | |
|---|---|---|
| EP | 3149305 B1 | 5/2018 |
| EP | 3650103 A1 | 5/2020 |
| EP | 3696385 A2 | 8/2020 |

OTHER PUBLICATIONS

Search report for European Patent Application No. EP 21 21 4229 dated Mar. 13, 2022.

*Primary Examiner* — Thomas B Will
*Assistant Examiner* — Julia C Tran
(74) *Attorney, Agent, or Firm* — Lempia Summerfield Katz LLC

(57) ABSTRACT

A screening device and a self-propelled harvester with a screening device. The screening device includes at least one suction nozzle that has an elongated hollow body with at least one suction opening which extends sectionally in the longitudinal direction and transverse direction of the hollow body, and is connected by at least one air duct in the interior of the hollow body to a connection arranged in the hollow body for connecting to a vacuum source. The suction opening is positioned facing a screen of the screening device. The air duct has a cross-sectional shape that increases in the vertical direction toward the connection starting from an outer end of the suction nozzle. An inner contour facing the suction opening of the air duct has a contour that substantially corresponds to an airfoil.

19 Claims, 10 Drawing Sheets

(51) Int. Cl.
*B01D 46/682* (2022.01)
*F01P 11/12* (2006.01)

(56) References Cited

U.S. PATENT DOCUMENTS

| | | | | |
|---|---|---|---|---|
| 5,183,487 | A * | 2/1993 | Lodico | F01P 11/12 |
| | | | | 55/289 |
| 5,466,189 | A * | 11/1995 | Deutsch | F01P 11/12 |
| | | | | 460/119 |
| 5,466,271 | A * | 11/1995 | Horvat | B01D 46/62 |
| | | | | 95/278 |
| 11,083,135 | B2 | 8/2021 | Neitemeier et al. | |
| 11,185,013 | B2 | 11/2021 | Heitmann et al. | |
| 11,376,946 | B2 * | 7/2022 | Mock | B60K 11/04 |
| 2009/0211208 | A1 * | 8/2009 | Johnson | B01D 46/10 |
| | | | | 55/282 |
| 2009/0320234 | A1 * | 12/2009 | Stoy | A47L 9/02 |
| | | | | 15/415.1 |
| 2010/0006361 | A1 | 1/2010 | Vandike et al. | |
| 2013/0014341 | A1 * | 1/2013 | Hershbarger | F01P 11/12 |
| | | | | 15/339 |
| 2017/0107893 | A1 * | 4/2017 | Davenport | B60S 1/62 |
| 2020/0147536 | A1 * | 5/2020 | Shriver | A01D 75/18 |
| 2020/0300270 | A1 * | 9/2020 | Clifford | F04D 29/703 |
| 2021/0317774 | A1 * | 10/2021 | Vandike | B01D 46/70 |

\* cited by examiner

SCREENING DEVICE WITH AT LEAST ONE SUCTION NOZZLE

CROSS REFERENCE TO RELATED APPLICATION

This application claims priority under 35 U.S.C. § 119 to German Patent Application No. DE 102021111281.8 filed Apr. 30, 2021, the entire disclosure of which is hereby incorporated by reference herein.

TECHNICAL FIELD

The invention relates to a screening device with at least one suction nozzle and to a self-propelling harvester that includes a screening device.

BACKGROUND

This section is intended to introduce various aspects of the art, which may be associated with exemplary embodiments of the present disclosure. This discussion is believed to assist in providing a framework to facilitate a better understanding of particular aspects of the present disclosure. Accordingly, it should be understood that this section should be read in this light, and not necessarily as admissions of prior art.

A screening device with at least one suction nozzle may be used in cooling apparatuses of self-propelling harvesters to prevent foreign bodies, such as chaff, husks and the like, as well as other dirt particles drawn by a fan of the cooling device, from being fed by the cooling air stream to a drive unit to be cooled of the self-propelled harvester, with the foreign bodies potentially creating a fire hazard. Using the fan, the cooling airflow flows through a screen or screening device, wherein foreign bodies and dirt particles contained therein may collect on the surface of the screen. These foreign bodies and dirt particles can be removed or sucked off the surface of the screen by a suction nozzle that has a suction opening facing the screen and is connected to a vacuum source. The connection for the vacuum source is generally located at an outer end of the suction nozzle such that the suction of the vacuum source decreases continuously in the longitudinal direction of the suction nozzle. An example of a screening device with a suction nozzle is disclosed in EP 3 149 305 B1.

BRIEF DESCRIPTION OF THE DRAWINGS

The present application is further described in the detailed description which follows, in reference to the noted drawings by way of non-limiting examples of exemplary implementation, in which like reference numerals represent similar parts throughout the several views of the drawings, and wherein.

DETAILED DESCRIPTION

Figure 1:
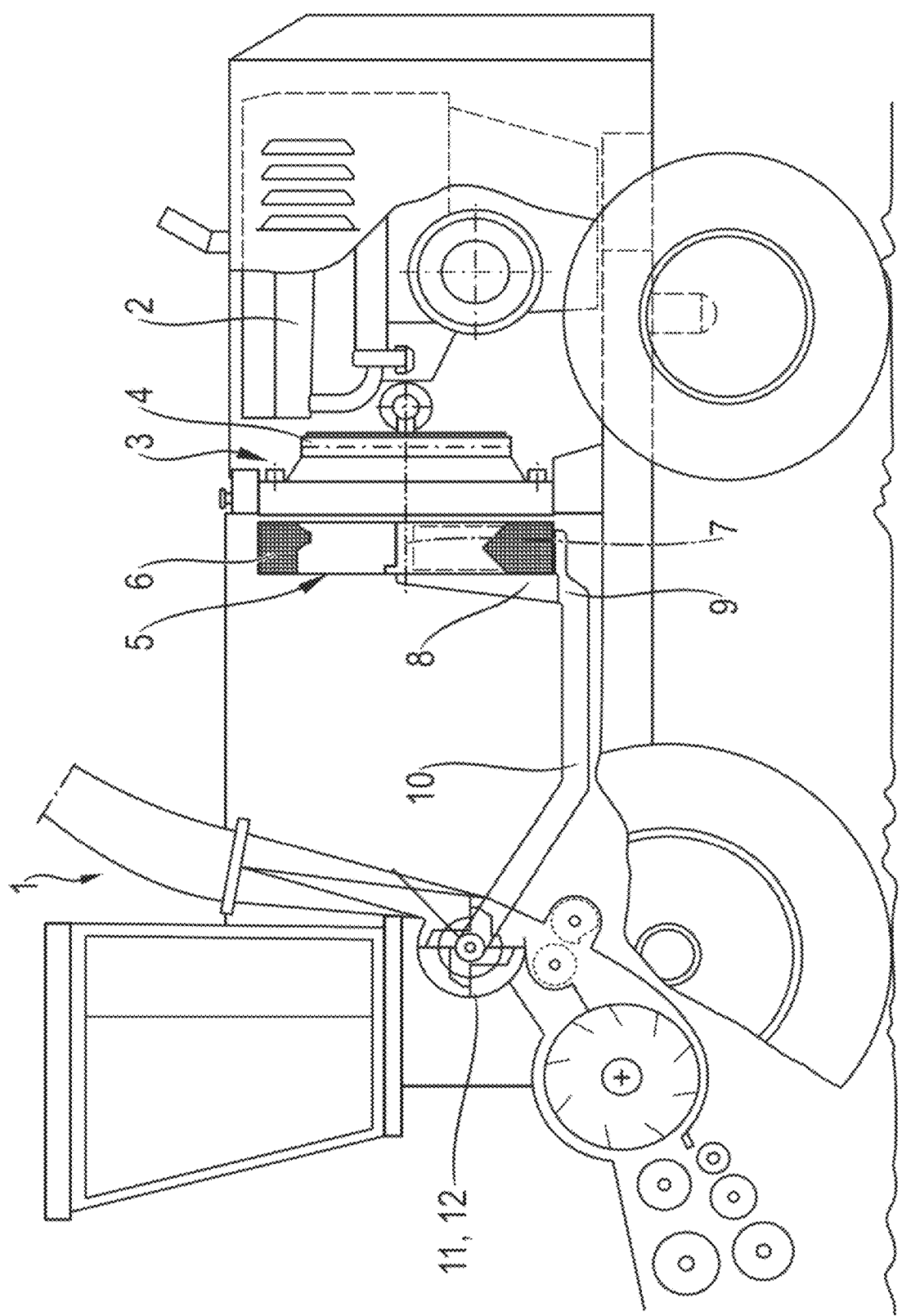
FIG. 1 schematically shows a self-propelling harvester designed as a forage harvester.

As discussed above, the connection for the vacuum source is generally located at an outer end of the suction nozzle such that the suction of the vacuum source decreases continuously in the longitudinal direction of the suction nozzle. When a screen is rotatingly driven or the suction nozzle rotates relative to the screen, the removal of dirt in a radial direction can be uneven. In particular, the distal end of the suction nozzle must cross a greater surface and remove much more dirt than the proximal end of the suction nozzle that lies closer to a central hub and the connection of the suction nozzle to the vacuum source. Accordingly, the performance at the distal end of the suction nozzle is less due to the relatively high speed and therefore shorter dwell time of the distal end of the suction nozzle in comparison to the relatively slow surface speed close to the middle of the suction nozzle. To even out the suction, EP 3 149 305 B1 designs the suction nozzle with several slits that are fluidically connected to each other by a common air duct in the suction nozzle that has a hollow body. The slits are arranged distributed with a varying distance relative to each other in the longitudinal direction of the suction nozzle.

Thus, in one or some embodiments, a screening device having at least one suction nozzle is disclosed that has improved suction in the region of the suction nozzle that is ultimately distal.

This may be achieved using a screening device that includes at least one suction nozzle that has a suction opening which extends sectionally in the longitudinal direction and transverse direction of the hollow body, and is connected by at least one air duct in the interior of the hollow body to a connection arranged or positioned in the hollow body for connecting to a vacuum source. The at least one suction opening may be arranged or positioned facing the screen of the screening device. According to one or some embodiments, the at least one air duct has a cross-sectional shape that increases in the vertical direction toward the connection starting from an outer end of the suction nozzle, wherein an inner contour facing the at least one suction opening of the at least one air duct has a contour substantially corresponding to an airfoil. Given the design of the inner contour corresponding to an airfoil in conjunction with the changing cross-sectional shape of the at least one air duct in the interior of the hollow body, an increase in the flow speed of the suction air flow is achieved as the distance from the connection increases which has a maximum value at the end of the suction opening facing the outer end of the suction nozzle. This may increase the suction speed in the distal region of the suction nozzle, which may improve the removal of adhesions on the screen of the screening device. The disclosed screening device may yield an increase in the functional reliability while suctioning.

In one or some embodiments, a volumetric flow that is necessarily delivered by the vacuum source may at least be kept constant or may even be reduced due to the more efficient suction by the suction nozzle designed according to the invention in comparison to a suction nozzle according to the prior art.

In one or some embodiments, starting from the connection, the inner contour of the at least one air duct may initially have a first region with a sectionally convex shape that transitions into a second region with a sectionally concave shape, and further transitions at the outer end of the hollow body into a third region with a convex shape. Due to this shape of the inner contour, the flow speed of the suction air flow may increase toward the connection from the region most remote from the connection of the at least one suction opening. The flow behavior may be flexibly adapted in the at least one air duct by the particular extension of the at least first and second region in the longitudinal direction of the suction nozzle.

In particular, the second region in the longitudinal direction may extend substantially over one-third up to one-half of the longitudinal extension of the at least one air duct.

In one or some embodiments, a profile section may extend sectionally in the longitudinal direction of the hollow body starting from the connection. Such a profile section may serve to additionally influence the flow behavior in the interior of the hollow body.

In particular, a top side of the profile section facing the inner contour may have a shape corresponding substantially to the first region of the air duct.

In one or some embodiments, the suction nozzle may have at least two suction opening (such as precisely two suction openings) that are arranged sequentially in the longitudinal direction and are connected by separate air ducts to the connection. Given the separate air ducts, a smaller quantity of particles adhering to the screen need be removed by the particular suction airflow when there are two separate openings, which increases the delivery effect.

In particular, the two suction openings may have an extension viewed in the longitudinal direction that substantially corresponds to one-half the longitudinal extension of an effective overall suction length of the suction nozzle. The overall suction length may correspond substantially to the radial extension of the screen traversed by the suction nozzle within which particles are suctioned from the surface of the screen.

In one or some embodiments, the two suction openings may be arranged laterally offset from each other viewed in the longitudinal direction. In particular, there may be a sectional overlap of the two suction openings. Due to the sectional overlap, improved suction may be achieved in a transitional region between the suction openings that is formed viewed in the longitudinal direction of the suction nozzle.

In one or some embodiments, two suction nozzles may be arranged opposite each other and have a common connection. The common connection may be arranged coaxial to an imaginary axis running perpendicular to the midpoint of the screen.

In particular, the connection may be arranged basically or substantially in the middle of the hollow body of the suction nozzle and, starting from the central connection, air ducts may extend that mirror each other on both sides and are connected by a continuous suction opening to the connection. These may be two air ducts of which one extends diametrically to the outside starting from the connection arranged in the middle. In addition, two air ducts may also be provided on each side of the suction nozzle that extend at least sequentially and optionally also offset from each other in the longitudinal direction of the suction nozzle. Given the central arrangement of the connection, the air delivery path may be shortened, such as halved. The connection to the midpoint of the screen may be arranged or positioned offset in a radial direction.

Alternatively, the connection may be arranged or positioned substantially in the middle of the hollow body of the suction nozzle and, starting from the connection arranged in the middle, mirrored air ducts may extend on both sides that connect several suction openings to the connection.

In one or some embodiments, the connection may be arranged eccentrically (e.g., having an axis located elsewhere than its geometric center; not symmetrical with respect to a center) and extend substantially perpendicular to a side wall of the hollow body.

In one or some embodiments, the screen may be rotatingly driven, and the at least one suction nozzle may be arranged in fixed relation to the screen. This arrangement enables an arrangement of both for example two diametrically arranged suction nozzles with a common connection in the middle of the screen, as well as the embodiment of the arrangement of the connection in the middle of the hollow body of the suction nozzle.

Alternatively, the screen may be arranged fixedly (e.g., in a fixed position), and the suction nozzle may be relatively movable in comparison to the screen.

In one or some embodiments, a self-propelling harvester is disclosed. The self-propelling harvester may include: a drive unit; a screening device; a vacuum source; and a cooling device assigned to the drive unit and comprising a suction fan configured to draw an airflow through the screening device. The screening device may include: a screen; at least one suction nozzle that has an elongated hollow body with at least one suction opening which extends sectionally in a longitudinal direction and in a transverse direction of the hollow body; at least one air duct connecting an interior of the hollow body to a connection positioned in or on the hollow body, with the connection connected to the vacuum source. Further, the connection may be positioned facing the screen of the screening device, the at least one air duct may have a cross-sectional shape that increases in a vertical direction toward the connection starting from an outer end of the suction nozzle, and an inner contour facing the at least one suction opening (such as at least one substantially slotted suction opening) of the at least one air duct may have a contour substantially corresponding to an airfoil.

Referring to the figures, FIG. 1 shows a schematic example of a self-propelling harvester 1 designed, for example, as a forage harvester. An example of a forage harvester is disclosed in U.S. Pat. No. 11,185,013, incorporated by reference herein in its entirety. The harvester 1 may also be designed as a self-propelling combine. An example of a combine is disclosed in U.S. Pat. No. 11,083,135, incorporated by reference herein in its entirety. In one or some embodiments, the harvester 1 comprises a drive unit 2 designed as an internal combustion engine that is assigned a cooling device 3. The cooling device 3 comprises a suction fan 4 that draws an airflow, such as a cooling airflow, through a screening device 5. The screening device 5 has a screen 6. In the depicted embodiment, the screen 6 is rotatingly driven about an axis 7. In one or some embodiments, the drive unit 2 is configured to act as the motor to rotatingly drive the screen 6. Alternatively, a separate motor may rotatingly drive the screen 6. The screening device 5 comprises at least one suction nozzle 8. Via a connection 9 arranged or positioned on its end, the at least one suction nozzle 8 is connected by a feedline 10 to a vacuum source 11. In the depicted embodiment, the vacuum source 11 may, for example, be designed as a postaccelerator 12 of the self-propelling harvester 1 (e.g., a forage harvester) and operate like a suction fan. The vacuum source 11 may be designed as a separate suction fan 15 as shown, for example, in FIG. 2, which may be controlled by a control unit, for example a drive control unit, independent of the operating state of the harvester 1. The control unit may comprise a processor and a memory (not shown) for controlling the operation of the vacuum source 11.

Figure 2:
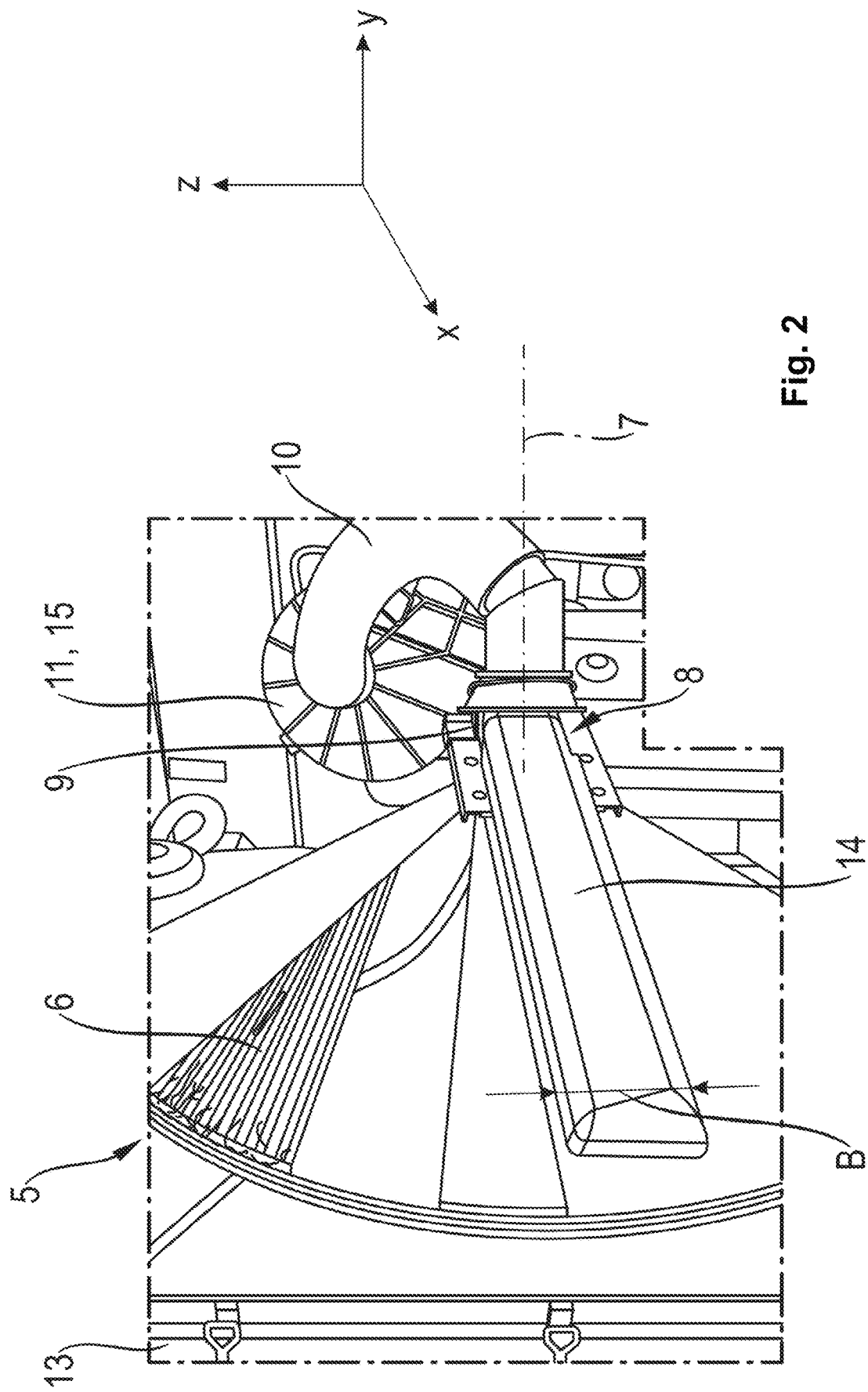
FIG. 2 schematically shows a view of a screening device.

FIG. 2 schematically shows a view of a screening device 5 according to an alternative embodiment. A substantially funnel-shaped screen 6 is arranged or positioned fixed on a frame 13 in the engine compartment of the harvester 1. The at least one suction nozzle 8 is arranged or positioned to rotate about the axis 7. The at least one suction nozzle 8 has an elongated hollow body 14 with at least one suction opening 16 that extends sectionally in the longitudinal direction x (e.g., in a radial direction relative to the axis 7 and in the transverse direction y of the hollow body 14). The at least one suction opening 16 is connected by at least one air duct 17 in the interior of the hollow body 14 to the connection 9 arranged or positioned on the hollow body 14 for connection to the vacuum source 11. The at least one suction opening 16 is arranged or positioned facing the screen 6 of the screening device 5. In one or some embodiments, the suction nozzle 8 may have a substantially constant width B over its entire length viewed in the transverse direction y.

Figure 3:
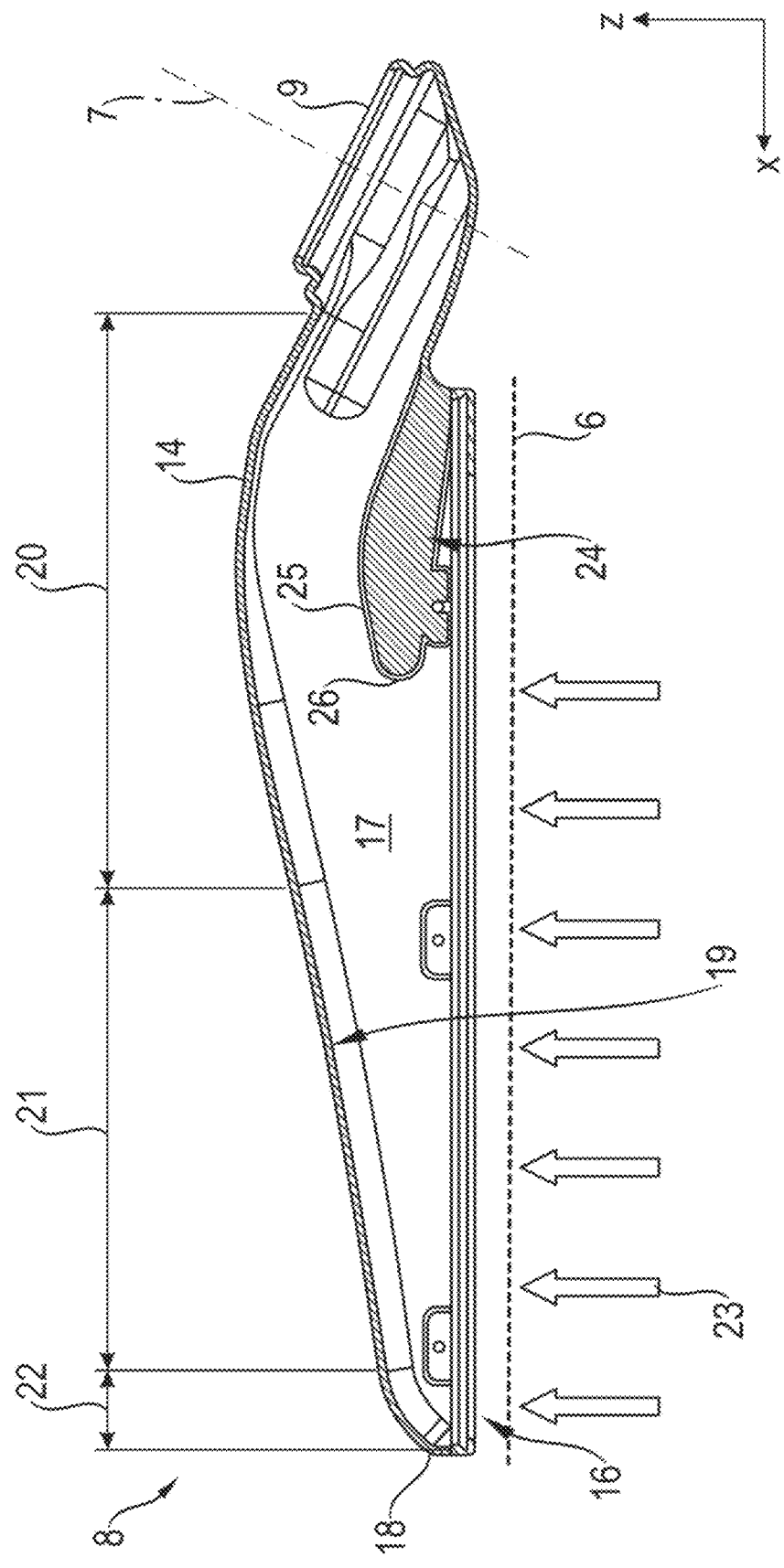
FIG. 3 schematically shows a first embodiment of a suction nozzle for a screening device according to FIG. 2 in a longitudinal section.

The depiction in FIG. 3 shows a first embodiment of the suction nozzle 8 of the screening device 5 in a longitudinal section. The air duct 17 in the interior of the hollow body 14 extends from the connection 9 on which the feedline 10 is arranged or positioned to the outer end 18 of the suction nozzle 8. Starting from the outer end 18 of the suction nozzle 8 in the longitudinal direction x of the hollow body 14 to the connection 9, the hollow body 14 has a cross-sectional shape that increases in the vertical direction z of the hollow body 14. An inner contour 19 of the at least one air duct 17 facing the at least one suction opening 16 has a contour substantially corresponding to an airfoil. In one or some embodiments, the airfoil comprises a cross-sectional shape that is, similar to a conventional airfoil capable of producing lift when moving in air (e.g., generating significant lift, such as the shape of a wing, rotor, or turbine), is shaped such that one or more sections result in air flow speed being increased (and optionally other sections result in air flow speed being decreased). The inner contour 19 is the region in the interior of the hollow body 14 running parallel to the at least one suction opening 16 by which the cross-sectional shape changes in the vertical direction z. The inner contour 19 corresponding to an airfoil results in a variation of the cross-section in the interior of the suction nozzle 8 through which the suction air flow flows, which may cause an increase in the flow speed of the suction air flow for a given suction air volume flow in a section of the at least one suction opening 16 more distant from the connection 9. This may bring about an increase in the suction speed without simultaneously increasing the suction air volume flow. The functional reliability of the cooling device 3 may be increased by the improved suction of the screen 6.

In one or some embodiments, the inner contour 19 of the at least one air duct 17 of the suction nozzle 8 initially has a first region 20, starting from the connection 9, with a sectionally convex shape that transitions into a second region 21 with a sectionally concave shape, and transitions into a third region 22 with a convex shape toward the outer end 18 of the hollow body 14. On the outside, the suction nozzle 8 may have a different contour from the inner contour 19.

The suction direction of a suction air flow is identified with arrows 23 in which the at least one suction opening 16 of the suction nozzle 8 facing the only suggested screen 6 of the screening device 5 sucks in or off the suction air flow together with particles that collect on the screen surface. The extension of the suction opening 16 in the longitudinal direction describes the effective overall suction length of the suction nozzle 8 over which of the screen surface of the screen 6 is sucked.

In the first region 20, the vertical distance between the suction opening 16 and the inner contour 19 is reduced by a profile section 24 extending sectionally in the longitudinal direction x. In one or some embodiments, the profile section 24 extends over the width of the suction nozzle 8 viewed in the transverse direction y. The profile section 24 therefore forms a closed surface that extends in the transverse direction of the hollow body 14.

The profile section 24 has a contour of its top side 25 facing the inner contour 19 corresponding to the shape of the first region 20. The contour of the top side 25 is curved outward (e.g., extends toward the first region 20 of the inner contour 19). Proceeding from the region of the connection 9, the shape of the contour of the top side 25 first rises and then falls after a transition point. An end-face section 26 facing the outer end 18 of the suction nozzle 8 is designed as a bump with a small radius of curvature to minimize or prevent swirling at the end-face section 26. The sectional extension in the longitudinal direction x of the profile section 24 brings about a reduction of the cross-section in the first region 20 in the longitudinal direction x, which causes the flow speed of the suction airflow to initially increase.

Directly after the profile section 24, there is a sudden expansion of the cross-section in the outgoing first region 20 due to the increase in the distance between the suction opening 16 and the inner contour 19. This may cause the flow speed of the suction air flow to decrease.

In the following second region 21 viewed in the longitudinal direction x, the cross-section continuously decreases, which may cause an increase in the flow speed of the suction air flow. The second region 21 basically or substantially extends in the longitudinal direction x over a portion of the longitudinal extension of the air duct, such as one-third to one-half of the longitudinal extension of the air duct 17 (e.g., more than a quarter of the longitudinal extension of the air duct 17; less than one-half of the longitudinal extension of the air duct 17; at least one-half of the longitudinal extension of the air duct 17; etc.). As the distance to the first region 20 increases, the flow speed of the suction air flow increases, which may improve the suction of the deposited, adhering particles on the surface of the screen 6, in particular in the distal suction region of the suction nozzle 8.

In one or some embodiments, the third region 22 forms the outer end 18 of the suction nozzle 8. The third region 22 is the shortest, and moreover has the smallest cross-section. The convex shape of the third region 22 forms an end-face limit to the hollow body 14. The suction air flow is primarily deflected here.

Figure 4:
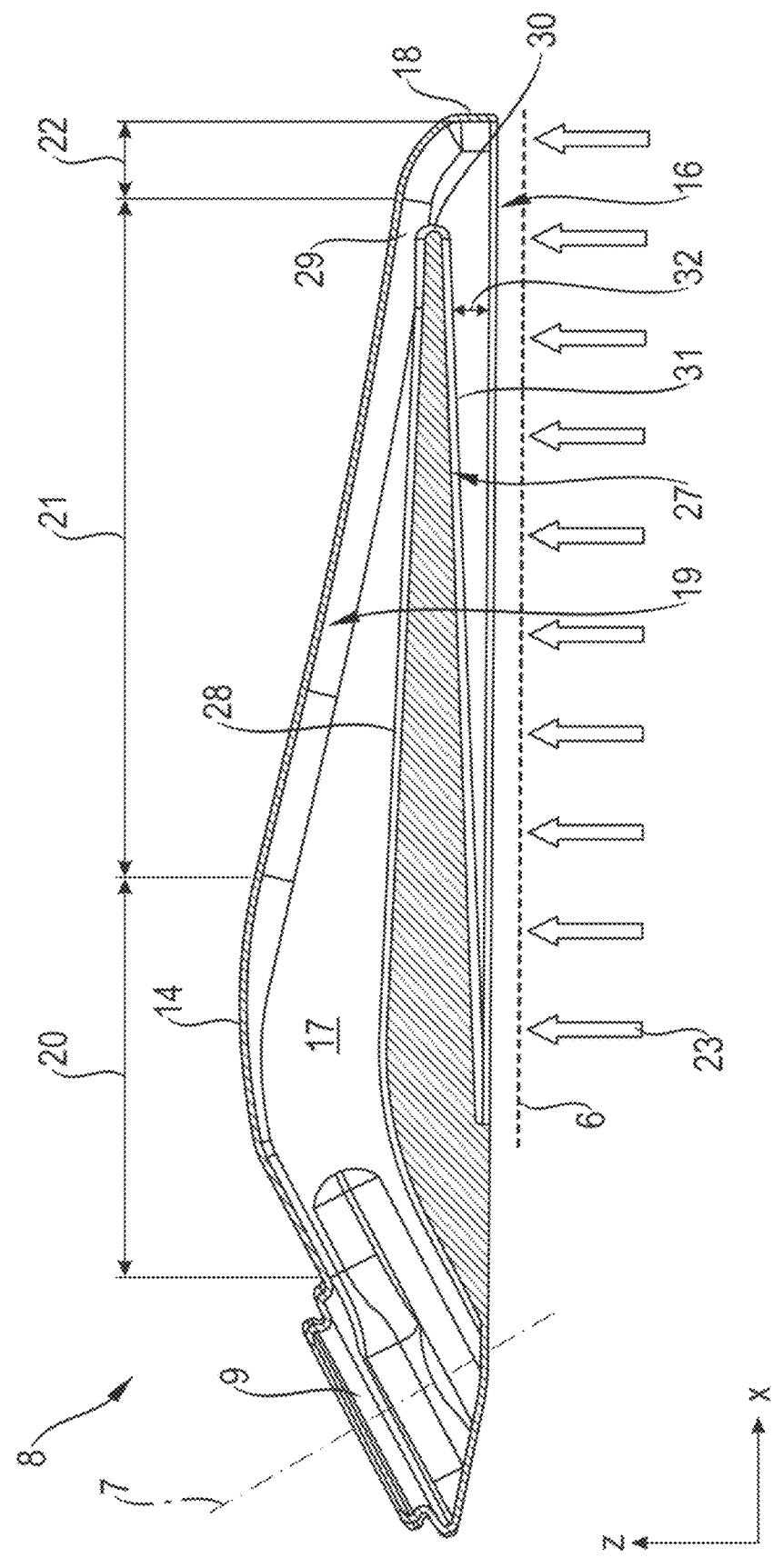
FIG. 4 schematically shows another embodiment of a suction nozzle for a screening device according to FIG. 2 in a longitudinal section.

FIG. 4 schematically portrays another embodiment of the suction nozzle 8 for the screening device 5 according to FIG. 2. The suction nozzle 8 shown in FIG. 4 is in an arrangement that is rotated 180° to the vertical direction z in comparison to the depiction according to FIG. 3. The basic design is identical with the suction nozzle 8 shown in FIG. 3 so that the reference numbers used there for identical components and assemblies are retained. According to the second embodiment of the suction nozzle 8, a profile section 27 with a different design is provided. The profile section 27 extends in the longitudinal direction x nearly over the entire length of the suction opening 16. The profile section 27 also has a shape of the contour of its top side 28 facing the inner contour 19 that initially corresponds to the first region 20 and, in the first region 20, transitions into a shape substantially parallel to the suction opening 16. The profile section 27 extends nearly to the end of the second region 21 of the inner contour 19 so that a gap-like opening 29 remains that extends in the transverse direction y. Because of the shape of the top side 28 of the profile section 27 that is basically parallel with the suction opening 16, the cross-section through which air flows between the inner contour 19 and the top side 28 gradually decreases in the longitudinal direction x. Accordingly, the suction air flow has the greatest flow speed at the transition from the second region 21 to the third region 22, and in the third region 22.

The end-face section 30 of the profile section 27 facing the outer end 18 of the suction nozzle 8 is also designed as a bump with a small radius of curvature. The suction air flow drawn through the suction opening 16 is deflected around the end-face section 30 of the profile section 27. The bottom side 31 of the profile section 27 faces the suction opening 16. In the longitudinal direction x viewed from the connection 9, the contour of the bottom side 31 of the profile section 27 has a rising shape basically in the form of a ramp. A distance 32 between the suction opening 16 and the bottom side 31 of the profile section 27 decreases in the longitudinal direction x. The design of the bottom side 31 of the profile section 27 causes an adequate suction effect to also be achieved in the region of the suction nozzle 8 facing the connection 9. At the end of the bottom side 31 in the end-face section 30, the distance 32 is the greatest. The effect that is otherwise achieved by the design of the profile section 27 substantially corresponds to the embodiment according to FIG. 3. Suction occurs through at least part (e.g., the entire longitudinal extension) of the suction opening 16 with an undivided suction air flow.

Starting from the connection 9, the flow speed of the suction air flow increases in the longitudinal direction x between the top side 28 of the profile section 27 and the inner contour 19 due to the contour corresponding to the airfoil, whereas on the bottom side 31 of the profile section 27 starting from the region of the profile section 27 closest to the connection 9, a decrease of the flow speed of the suction air flow occurs in the longitudinal direction x from the ramp-like shape of the bottom side 31. In this regard, the inner contour 19 is shaped such that in certain sections (e.g., between the top side 28 of the profile section 27 and the inner contour 19) result in air flow speed increases and in other sections (e.g., on the bottom side 31 of the profile section 27 starting from the region of the profile section 27 closest to the connection 9) result in air flow speed decreases.

Figure 5A:
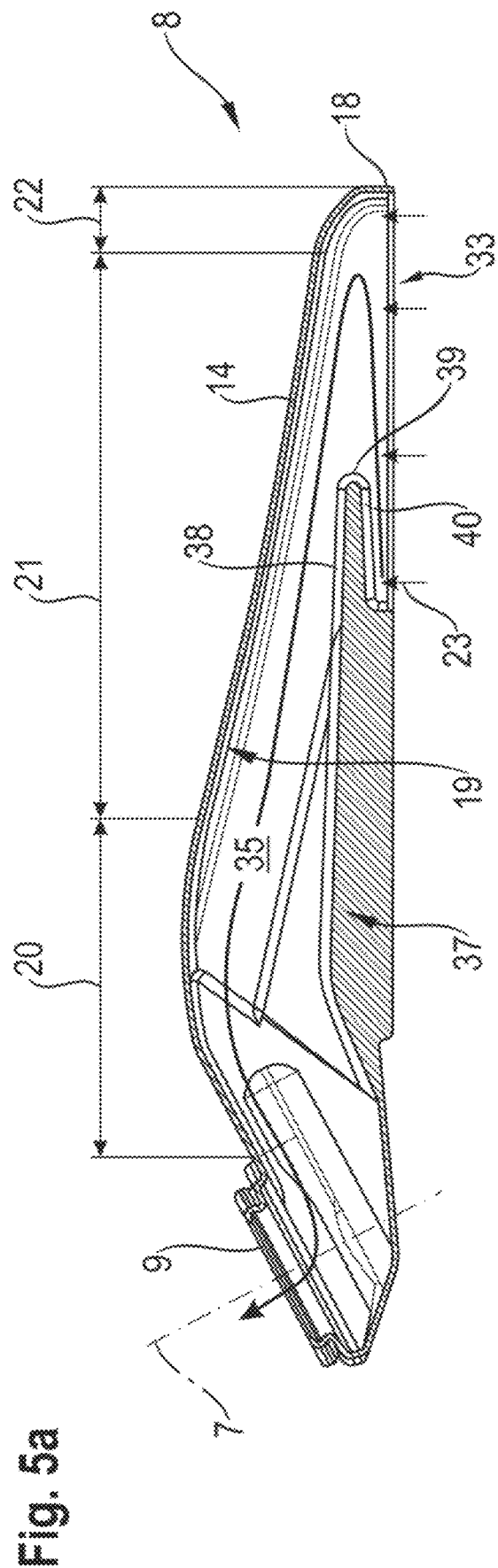
FIG. 5*a*, 5*b* schematically show another embodiment of a suction nozzle for a screening device according to FIG. 2 in a longitudinal section.
Figure 5B:
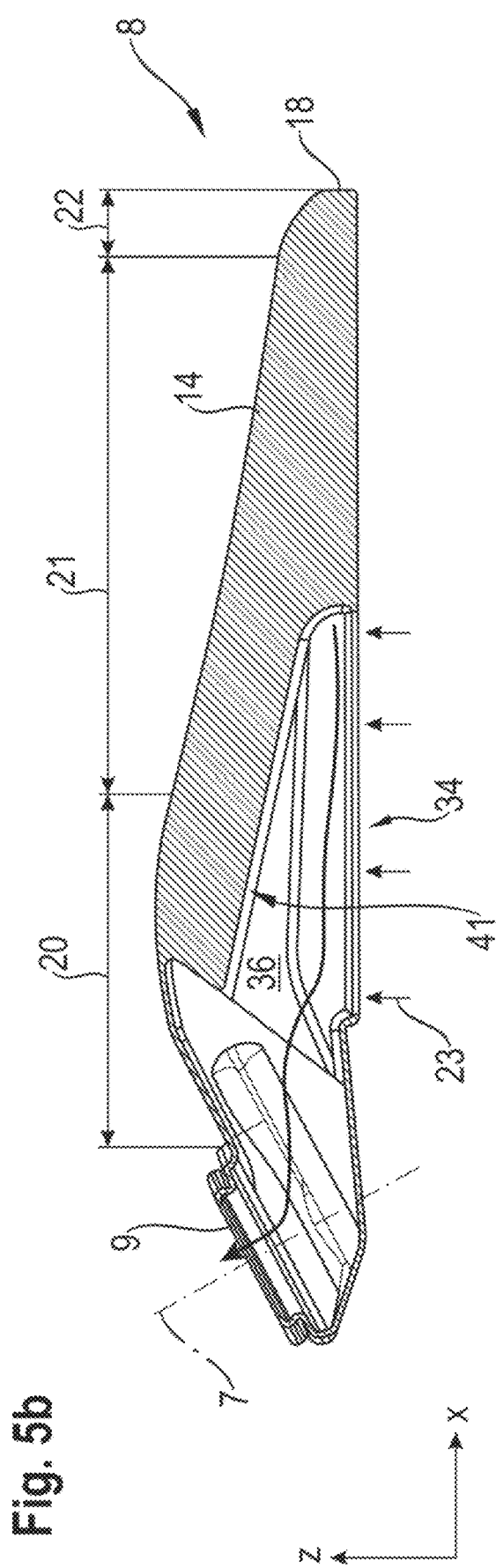

The depictions in FIGS. 5*a* and 5*b* schematically show another embodiment of a suction nozzle 8 for a screening device according to FIG. 2 in a longitudinal section. The sectional planes are offset from each other in the transverse direction y. Accordingly, FIG. 5*a* shows a region lying further to the front in the transverse direction y, and FIG. 5*b* shows a region of the suction nozzle 8 lying offset further to the rear in the transverse direction y. The exterior shape and form of the suction nozzle 8 corresponds substantially to that of the embodiments of the suction nozzle 8 described above and shown in FIGS. 2 to 4.

Figure 6:
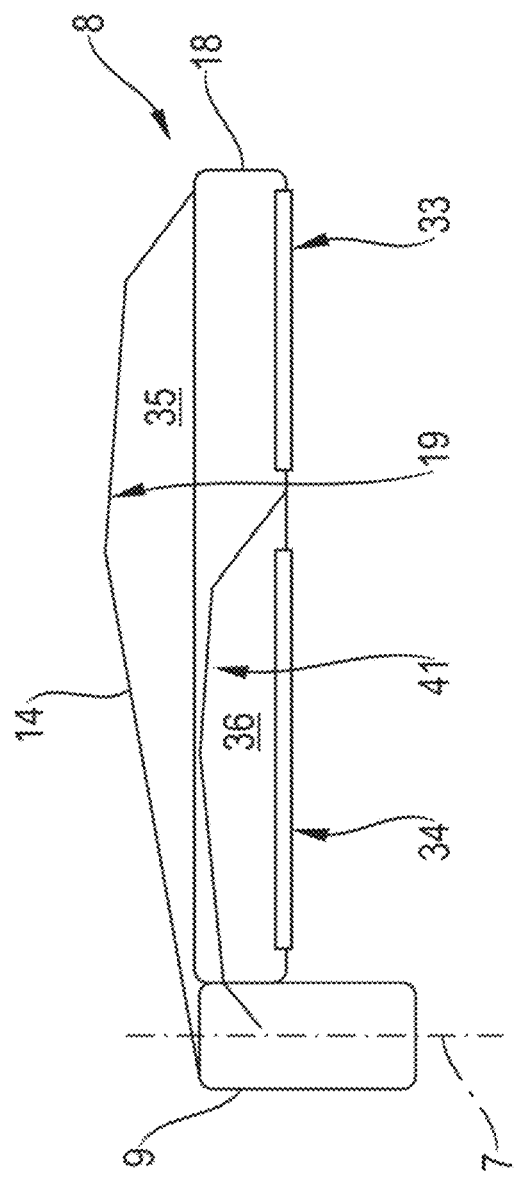
FIG. 6 shows the suction nozzle according to FIGS. 5*a* and 5*b* schematically and highly simplified in a side view.

The suction nozzle 8 in FIGS. 5*a* and 5*b* has two suction openings 33, 34 that are arranged or positioned sequentially as viewed in the longitudinal direction x. The two suction openings 33, 34 each extend sectionally in the longitudinal direction x of the suction nozzle 8. As schematically shown in FIG. 6, the two suction openings 33, 34 are also arranged or positioned offset from each other in the transverse direction y.

Element 33 identifies a front suction opening whose distance from the connection 9 viewed in the longitudinal direction x is greater than the distance of the rear suction opening 34. Viewed in the longitudinal direction x, the particular suction opening 33, 34 has an extension that substantially corresponds to that of one-half the longitudinal extension of an effective overall suction length of the suction nozzle 8. The overall suction length corresponds to that of the radial extension of the screen 6 traversed by the suction nozzle 8 within which particles are sucked off the surface of the screen 6. The overall suction length is less than the overall length of the suction nozzle 8.

The suction air flow is divided by the suction nozzle 8 and guided through two separate air ducts 35, 36 that each fluidically connect one of the suction openings 33, 34 to the connection 9. Viewed in the vertical direction z, the air ducts 35, 36 are arranged or positioned in planes in the interior of the suction nozzle 8 that deviate from each other in sections, in particular lie on each other.

In FIG. 5*a*, the front suction opening 33 (e.g., the suction opening 33 extending sectionally from the outer end 18 toward the connection 9) is connected by the air duct 35 to the connection 9. In one or some embodiments, the inner contour 19 of the suction nozzle 8 facing the front suction opening 33 is identical with that of the embodiments described above.

In one or some embodiments, the air duct 35 that extends beyond the rear suction opening 34 (e.g., the suction opening 34 extending from the connection 9 to the beginning of the front suction opening 33) runs to the outer end 18 of the suction nozzle 8. That is, the air duct 35 extends over the entire longitudinal extension of the effective overall suction length. Starting from the connection 9, a bump-shaped profile section 37 extends toward the front suction opening 33 and sectionally overlaps it. The profile section 37 has a top side 38 facing the inner contour 19, an end-face section 39 facing the outer end 18 of the suction nozzle 8, as well as a bottom side 40 facing the front suction opening 33.

The distance between the end-face section 39 and the outer end 18 of the suction nozzle 8 is less than the length of the front suction opening 33. The bottom side 40 overlaps the front suction opening 33, wherein the distance between the bottom side 40 and the front suction opening 33 enlarges in the longitudinal direction x to the outer end 18.

According to FIG. 5*b*, the rear suction opening 34 (e.g., the suction opening 34 extending sectionally from the connection 9 toward the outer end 18) is connected by the air duct 36 to the connection 9. The air duct 36 extends substantially up to the beginning of the front suction opening 33, i.e., the side of the front suction opening 33 facing the connection 9. The air duct 36 has an inner contour 41 facing the rear suction opening 34 that also has a contour corresponding substantially to an airfoil like the inner contour 19 of the air duct 35.

The suction nozzle 8 designed according to the embodiment shown in FIGS. 5*a* and 5*b* accordingly has two air ducts 35, 36 of different length so that the volume of material of particles to be removed is divided in the suction air flow. The division of the suction air flow may also be influenced by the different opening cross-sections of the air ducts 35, 36 in the region of the connection 9. The portion of the suction air flow that is drawn through the front suction opening 33 may be larger than the portion that is drawn through the rear suction opening 34.

FIG. 6 portrays in a schematic and highly simplified manner the embodiment of the suction nozzle 8 according to FIGS. 5a and 5b in a side view. The extension of the front suction opening 33 and/or the rear suction opening 34 and its particular air ducts 35, 36 may be selected so that the distance in the middle region of the suction nozzle 8 is minimized therebetween.

Figure 7:
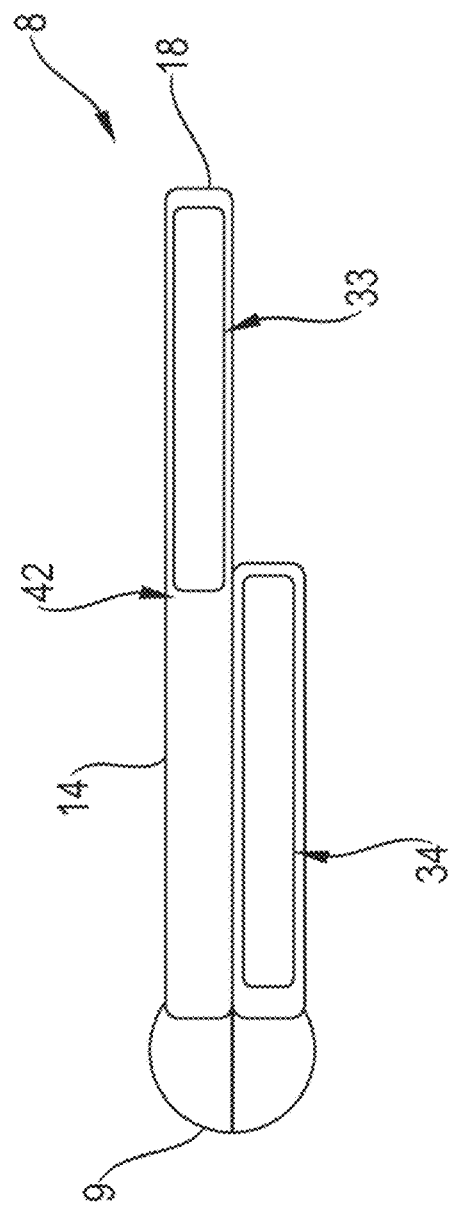
FIG. 7 shows another embodiment of a suction nozzle in a view from below schematically and highly simplified.

FIG. 7 shows in a schematic and highly simplified matter another embodiment of a suction nozzle 8 in a view from below. The design substantially corresponds to the embodiment according to FIGS. 5a and 5b, wherein the air ducts 35, 36 are arranged or positioned sequentially and adjacently when viewed in the perpendicular direction y. The particular extension of the rear suction opening 34 and the front suction opening 33 may be selected so that an overlapping suction region 42 of the two suction openings 33, 34 is formed that is substantially in the middle of the suction nozzle 8. Moreover, the air ducts 35, 36 are designed corresponding to the embodiment according to FIGS. 5a and 5b.

Figure 8:
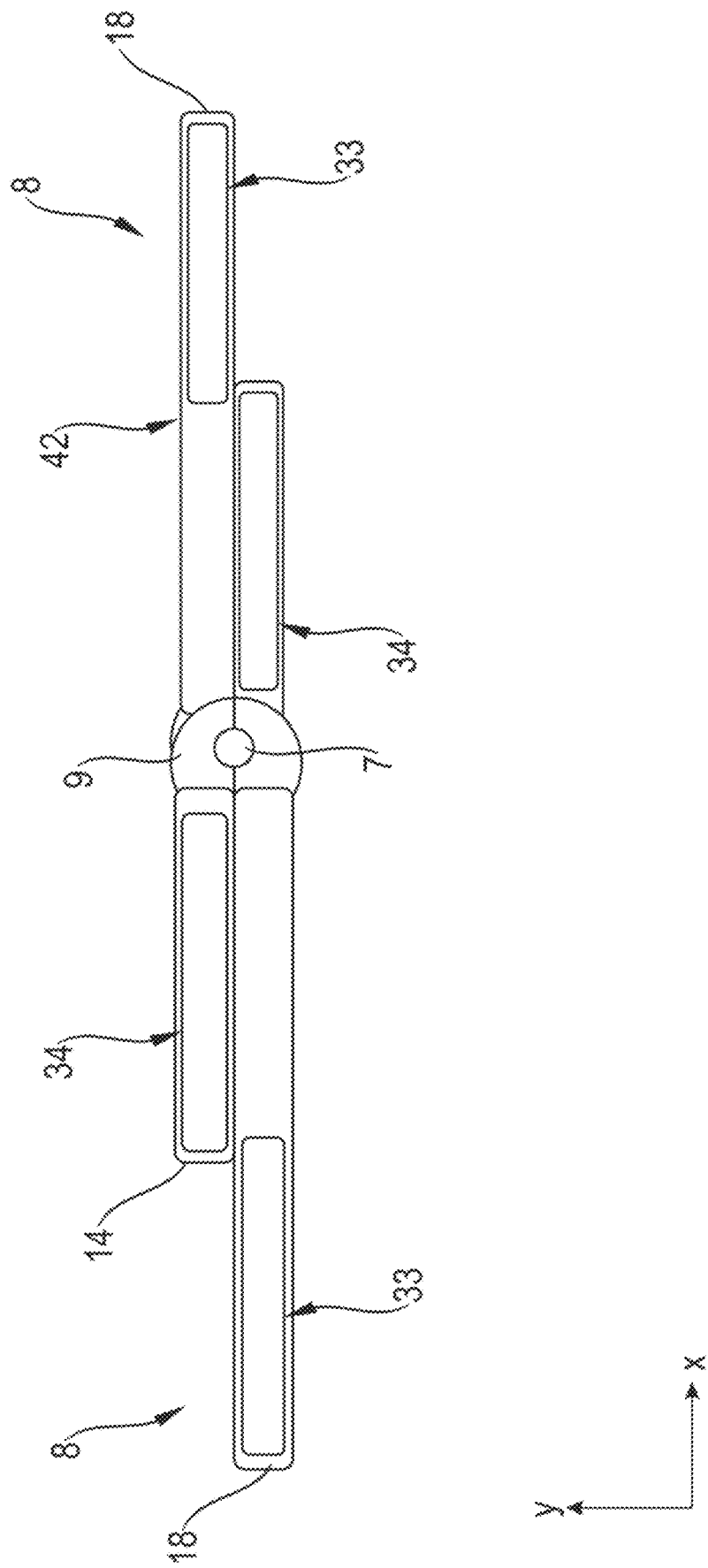
FIG. 8 shows a schematic example of an embodiment in which two suction nozzles are rotatingly arranged about a common axis.

FIG. 8 schematically shows an example of an embodiment in which two suction nozzles 8 are both arranged or positioned to rotate about the axis 7. The suction nozzles 8 are designed corresponding to the embodiment according to FIG. 7 and are arranged or positioned opposite each other offset by 180°. The connections 9 of the two suction nozzles 8 are connected to each other such that only a feedline 10 substantially coaxial to the axis 7 may be connected.

According to another embodiment, the connection 9 may be arranged or positioned in the middle of the hollow body 14 of the suction nozzle 8. Mirrored air ducts may extend on both sides from the connection 9 arranged or positioned in the middle, and are designed to correspond to the embodiment shown in FIG. 3; however, each has an extension in the transverse direction y that corresponds to approximately one-half the length of the air duct 17. A single suction opening extends over nearly the entire extension of the suction nozzle 8 in the longitudinal direction, and also does not have any interruption in the region of the connection 9 arranged or positioned in the middle. The inner contours of the mirror-symmetrical hollow body facing the continuous suction opening on both sides of the connection 9 have a contour that substantially corresponds to an airfoil. The additional advantage of the central arrangement of the connection 9 arranged or positioned the middle is that the air transport paths are shorter. This embodiment of the suction nozzle 8 is especially useful with a screen 6 that moves, in particular rotates, relative to the suction nozzle 8.

Figure 9:
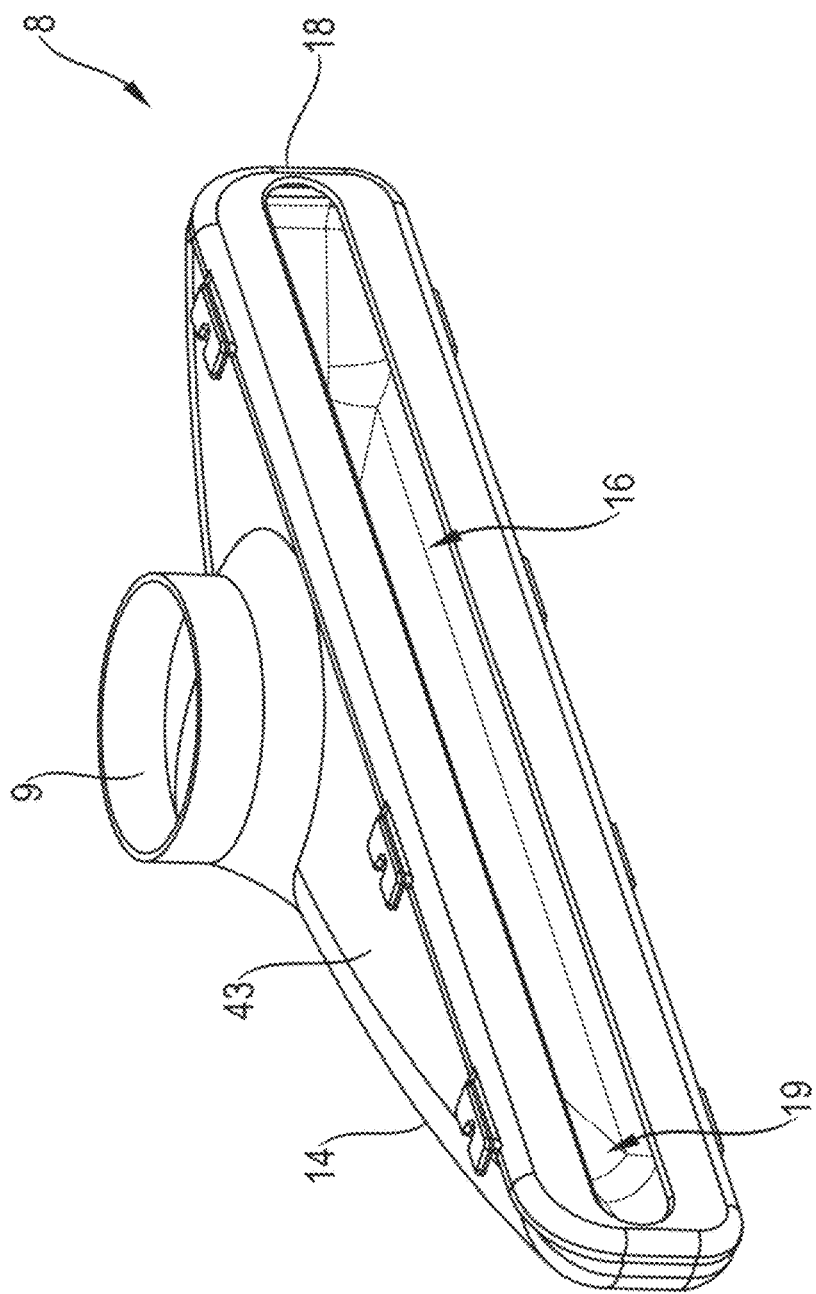
FIG. 9 shows a schematic example of another embodiment of a suction nozzle in a perspective view from below.

FIG. 9 schematically portrays an example of another embodiment of a suction nozzle 8 in a perspective view from below. This embodiment of the suction nozzle 8 differs on the one hand from the embodiment shown in FIG. 3 in terms of a different arrangement of the connection 9. Whereas the connection 9 according to the embodiment in FIG. 3 is arranged or positioned on the outer end of the hollow body 14, a position of the connection 9 in the middle region of the suction nozzle 8 is provided in the embodiment shown in FIG. 9. On the other hand, the suction nozzle 8 does not have a profile section extending sectionally in the longitudinal direction x.

The connection 9 is arranged or positioned eccentrically relative to the middle of the suction opening 16 of the suction nozzle 8. In particular, the connection 9 is arranged or positioned closer to the outer end 18 of the hollow body 14. Moreover, the connection 9 is arranged or positioned substantially perpendicular to the shape of the inner contour 19 (e.g., the connection 9 is formed on a side wall 43 on the outside of the hollow body 14). The eccentric arrangement of the connection 9 according to this embodiment has the advantage that the suction speed in the distal region of the suction nozzle 8 is elevated. This improves the removal of adhesions relative to the midpoint of the screen 6 in the radially more distant regions of the screen 6. Moreover, in this embodiment, a uniform suction speed is achieved in the longitudinal direction x of the suction nozzle 8.

Further, it is intended that the foregoing detailed description be understood as an illustration of selected forms that the invention may take and not as a definition of the invention. It is only the following claims, including all equivalents, that are intended to define the scope of the claimed invention. Further, it should be noted that any aspect of any of the preferred embodiments described herein may be used alone or in combination with one another. Finally, persons skilled in the art will readily recognize that in preferred implementation, some, or all of the steps in the disclosed method are performed using a computer so that the methodology is computer implemented. In such cases, the resulting physical properties model may be downloaded or saved to computer storage.

| Reference numbers | |
|---|---|
| 1 | Harvester |
| 2 | Drive unit |
| 3 | Cooling device |
| 4 | Suction fan |
| 5 | Screening device |
| 6 | Screen |
| 7 | Axis |
| 8 | Suction nozzle |
| 9 | Connection |
| 10 | Feed line |
| 11 | Vacuum source |
| 12 | Postaccelerator |
| 13 | Frame |
| 14 | Hollow body |
| 15 | Suction fan |
| 16 | Suction opening |
| 17 | Air duct |
| 18 | Outer area of 8 |
| 19 | Inner contour |
| 20 | First region |
| 21 | Second region |
| 22 | Third region |
| 23 | Suction direction |
| 24 | Profile section |
| 25 | Top side |
| 26 | End-face section |
| 27 | Profile section |
| 28 | Top side |
| 29 | Opening |
| 30 | End-face section |
| 31 | Bottom side |
| 32 | Distance |
| 33 | Suction opening |
| 34 | Suction opening |
| 35 | Air duct |
| 36 | Air duct |
| 37 | Profile section |
| 38 | Top side |

-continued

| Reference numbers | |
|---|---|
| 39 | End-face section |
| 40 | Bottom side |
| 41 | Inner contour |
| 42 | Suction region |
| 43 | Side wall |
| B | Width |
| X | Longitudinal direction |
| y | Transversal direction |
| z | Vertical direction |

The invention claimed is:

1. A screening device for a self-propelling harvester, the screening device comprising:
a screen;
at least one suction nozzle that has an elongated hollow body with at least one suction opening which extends sectionally in a longitudinal direction and in a transverse direction of the hollow body; and
at least one air duct connecting an interior of the hollow body to a connection positioned in or on the hollow body, with the connection configured to connect to a vacuum source;
wherein the connection is positioned facing the screen of the screening device;
wherein the at least one air duct has a cross-sectional shape that increases in a vertical direction toward the connection starting from an outer end of the at least one suction nozzle; and
wherein an inner contour facing the at least one suction opening of the at least one air duct has a contour substantially corresponding to an airfoil;
wherein the inner contour of the at least one air duct comprises a first region with a sectionally convex shape that transitions into a second region with a sectionally concave shape;
wherein the first region starts from the connection; and
wherein the second region transitions into a third region with a convex shape toward the outer end of the hollow body.

2. The screening device of claim 1, wherein the second region substantially extends in the longitudinal direction over one-third to one-half a longitudinal extension of the at least one air duct; and
wherein a cross-section of the second region, viewed in the longitudinal direction, continuously decreases and is configured to cause an increase in flow speed of suction air flow.

3. The screening device of claim 1, wherein the at least one suction nozzle has at least two suction openings that are positioned sequentially in the longitudinal direction and are connected by separate air ducts to the connection;
wherein the at least two suction openings have an extension viewed in the longitudinal direction that substantially corresponds to one-half a longitudinal extension of an effective overall suction length of the at least one suction nozzle; and
wherein the at least two suction openings are positioned laterally offset from each other viewed in the longitudinal direction.

4. The screening device of claim 1, wherein the connection is positioned substantially in a middle of the hollow body of the at least one suction nozzle; and
wherein, starting from the connection positioned in the middle of the hollow body, mirrored air ducts extend on both sides that connect a continuous suction opening to the connection.

5. The screening device of claim 1, wherein the connection is positioned substantially in a middle of the hollow body of the at least one suction nozzle; and
wherein, starting from the connection positioned in the middle of the hollow body, mirrored air ducts extend on both sides that connect a plurality of suction openings to the connection.

6. The screening device of claim 1, wherein the connection is positioned eccentrically and extends substantially perpendicular to a side wall of the hollow body;
further comprising a motor configured to rotatingly drive the screen; and
wherein the at least one suction nozzle is positioned in fixed relation to the screen.

7. A self-propelling harvester comprising:
a drive unit;
a screening device;
a vacuum source; and
a cooling device assigned to the drive unit and comprising a suction fan configured to draw an airflow through the screening device;
wherein the screening device comprises:
a screen;
at least one suction nozzle that has an elongated hollow body with at least one suction opening which extends sectionally in a longitudinal direction and in a transverse direction of the hollow body; and
at least one air duct connecting an interior of the hollow body to a connection positioned in or on the hollow body, with the connection connected to the vacuum source;
wherein the connection is positioned facing the screen of the screening device;
wherein the at least one air duct has a cross-sectional shape that increases in a vertical direction toward the connection starting from an outer end of the at least one suction nozzle;
wherein an inner contour facing the at least one suction opening of the at least one air duct has a contour substantially corresponding to an airfoil; and
wherein the inner contour of the at least one air duct has a first region, starting from the connection, with a sectionally convex shape that transitions into a second region with a sectionally concave shape, and transitions into a third region with a convex shape toward an outer end of the hollow body.

8. The self-propelling harvester of claim 7, wherein the second region substantially extends in the longitudinal direction over one-third to one-half a longitudinal extension of the at least one air duct.

9. The screening device of claim 1, wherein the inner contour corresponding to the airfoil results in a variation of cross-section in an interior of the at least one suction nozzle through which suction air flow flows and which is configured to cause an increase in flow speed of the suction air flow for a given suction air volume flow in a section of the at least one suction opening more distant from the connection.

10. The screening device of claim 9, wherein the inner contour is configured to increase suction speed without simultaneously increasing the suction air volume flow.

11. The screening device of claim 9, further comprising a profile section that extends sectionally in the longitudinal direction of the hollow body starting from the connection; and wherein, in the first region, a vertical distance between the at least one suction opening and the inner contour is reduced by the profile section extending sectionally in the longitudinal direction.

12. The screening device of claim 11, wherein the profile section extends over a width of the at least one suction nozzle viewed in a transverse direction; and wherein the profile section is configured to form a closed surface that extends in the transverse direction of the hollow body.

13. The screening device of claim 12, wherein the profile section has a contour of its top side facing the inner contour corresponding to a shape of the first region; and wherein the contour of the top side is curved outward by extending toward the first region of the inner contour.

14. The screening device of claim 13, wherein, proceeding from the first region of the connection, a shape of the contour of the top side first rises and then falls after a transition point;

wherein an end-face section facing an outer end of the at least one suction nozzle comprises a bump with a predetermined radius of curvature configured to minimize or prevent swirling at the end-face section;

wherein a sectional extension in the longitudinal direction of the profile section results in a reduction of the cross-section in the first region in the longitudinal direction, which is configured to cause the flow speed of the suction air flow to initially increase;

wherein an expansion of a cross section, positioned after the profile section, in the first region due to the increase in distance between the at least one suction opening and the inner contour; and wherein the expansion of the cross section is configured to cause the flow speed of the suction air flow to decrease.

15. The screening device of claim 9, wherein the third region is shorter than the first region and the second region;

wherein the third region has a smaller cross-section than the first region and the second region; and wherein the convex shape of the third region forms an end-face limit to the hollow body and is configured to deflect the suction air flow.

16. The screening device of claim 9, further comprising a profile section that extends in the longitudinal direction of at least a part of the at least one suction opening;

wherein the profile section has a shape of a contour on its top side facing the inner contour that initially corresponds to the first region and, in the first region, transitions into a shape substantially parallel to the at least one suction opening; and wherein, due to the shape of the top side of the profile section that is substantially parallel with the at least one suction opening, the cross-section through which air flows between the inner contour and the top side gradually decreases in the longitudinal direction so that the suction air flow has a greatest flow speed in one or both of at a transition from the second region to the third region or in the third region.

17. The screening device of claim 16, wherein the profile section extends proximate to an end of the second region of the inner contour so that a gap-like opening remains that extends in the transverse direction.

18. The screening device of claim 9, wherein the at least one suction nozzle has at least two suction openings that are positioned sequentially as viewed in the longitudinal direction;

wherein the at least two suction openings extend sectionally in the longitudinal direction of the at least one suction nozzle;

wherein the at least two suction openings are positioned offset from each other in the transverse direction;

wherein one of the at least two suction openings comprise a front suction opening whose distance from the connection viewed in the longitudinal direction is greater than the distance of another of the at least two suction openings;

further comprising at least two air ducts that each fluidically connect to respective ones one of the at least two suction openings to the connection; and wherein, viewed in a vertical direction, the at least two air ducts are positioned in planes in the interior of the at least one suction nozzle that at least partly deviate from each other.

19. The self-propelling harvester of claim 7, wherein the inner contour corresponding to the airfoil results in a variation of cross-section in an interior of the at least one suction nozzle through which suction air flow flows and which is configured to cause an increase in flow speed of the suction air flow for a given suction air volume flow in a section of the at least one suction opening more distant from the connection.

* * * * *